(12) United States Patent
Lee

(10) Patent No.: US 9,729,184 B2
(45) Date of Patent: Aug. 8, 2017

(54) CASE FOR ELECTRONIC DEVICE

(71) Applicant: Chiun Mai Communication Systems, Inc., New Taipei (TW)

(72) Inventor: Ko-Han Lee, New Taipei (TW)

(73) Assignee: Chiun Mai Communication Systems, Inc., New Taipei (TW)

(*) Notice: Subject to any disclaimer, the term of this patent is extended or adjusted under 35 U.S.C. 154(b) by 0 days.

(21) Appl. No.: 14/982,180

(22) Filed: Dec. 29, 2015

(65) Prior Publication Data

US 2016/0191099 A1 Jun. 30, 2016

(30) Foreign Application Priority Data

Dec. 31, 2014 (CN) .......................... 2014 1 0845579

(51) Int. Cl.
*H04B 7/00* (2006.01)
*H04B 1/3888* (2015.01)

(52) U.S. Cl.
CPC ................... *H04B 1/3888* (2013.01)

(58) Field of Classification Search
CPC .... H04M 1/02; H04M 1/0202; H04R 1/1033; H04R 2201/02
See application file for complete search history.

(56) References Cited

U.S. PATENT DOCUMENTS

| 9,491,878 B2* | 11/2016 | Moon | H05K 7/00 |
| 2005/0250562 A1* | 11/2005 | Carroll | H04M 1/0214 455/575.3 |
| 2014/0185206 A1* | 7/2014 | Kim | H05K 5/0017 361/679.01 |
| 2014/0204511 A1* | 7/2014 | Oh | G06F 1/1632 361/679.01 |
| 2014/0274214 A1* | 9/2014 | Kim | H04M 1/0266 455/566 |
| 2015/0065202 A1* | 3/2015 | Lee | H04M 1/185 455/566 |
| 2015/0194997 A1* | 7/2015 | Johnson | H04B 1/3888 455/575.8 |
| 2015/0229754 A1* | 8/2015 | Won | G06F 1/165 455/575.8 |
| 2015/0280770 A1* | 10/2015 | Rhee | H04B 1/3888 455/575.8 |
| 2015/0311940 A1* | 10/2015 | Lee | H04B 1/3888 455/575.8 |
| 2015/0346779 A1* | 12/2015 | Chae | G06F 1/1677 715/773 |
| 2015/0372721 A1* | 12/2015 | Bard | H04B 5/0075 455/575.8 |
| 2016/0026425 A1* | 1/2016 | Lee | G06F 3/0416 345/2.2 |
| 2016/0182115 A1* | 6/2016 | Chen | H04B 1/3888 455/575.8 |

* cited by examiner

*Primary Examiner* — Bobbak Safaipour
(74) *Attorney, Agent, or Firm* — Steven Reiss

(57) ABSTRACT

A case for an electronic device having a pressure-sensitive touchscreen includes a cover configured to adhere to the pressure-sensitive touchscreen when the cover is in a closed state. The pressure-sensitive touchscreen receives touch input through the cover.

19 Claims, 7 Drawing Sheets

CASE FOR ELECTRONIC DEVICE

FIELD

The subject matter herein generally relates to electronic devices, and more particularly to an electronic device and a case for receiving the electronic device therein.

BACKGROUND

Generally, cases for electronic devices include a cover for covering a screen of the electronic device. To operate the electronic device, the cover may need to be removed, which may cause inconvenience to a user of the electronic device.

BRIEF DESCRIPTION OF THE DRAWINGS

Implementations of the present technology will now be described, by way of example only, with reference to the attached figures.

DETAILED DESCRIPTION

Figure 1:
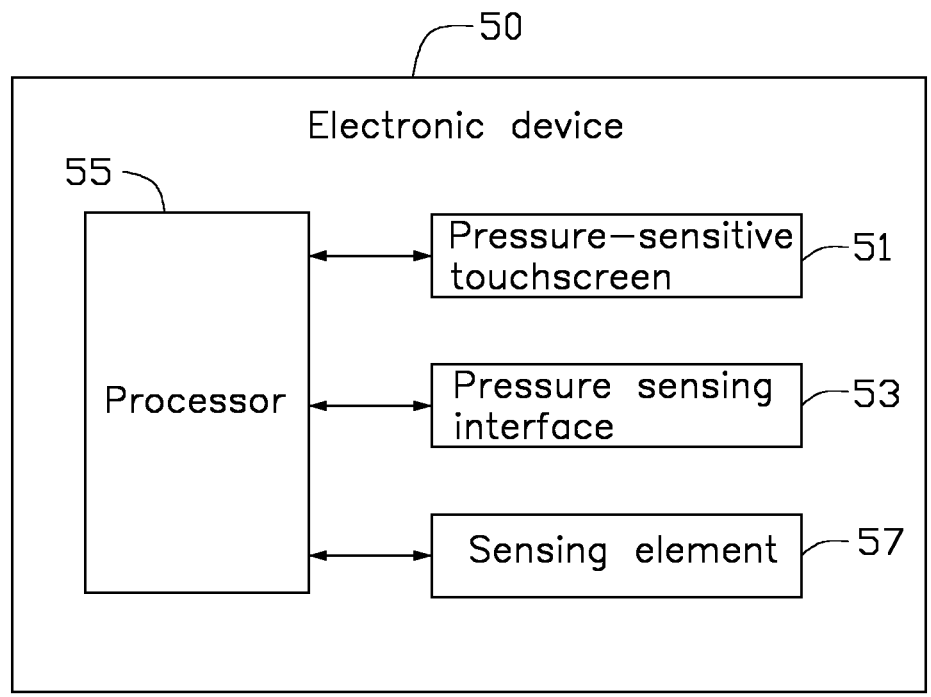
FIG. 1 is a block diagrammatic view of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

Figure 2:
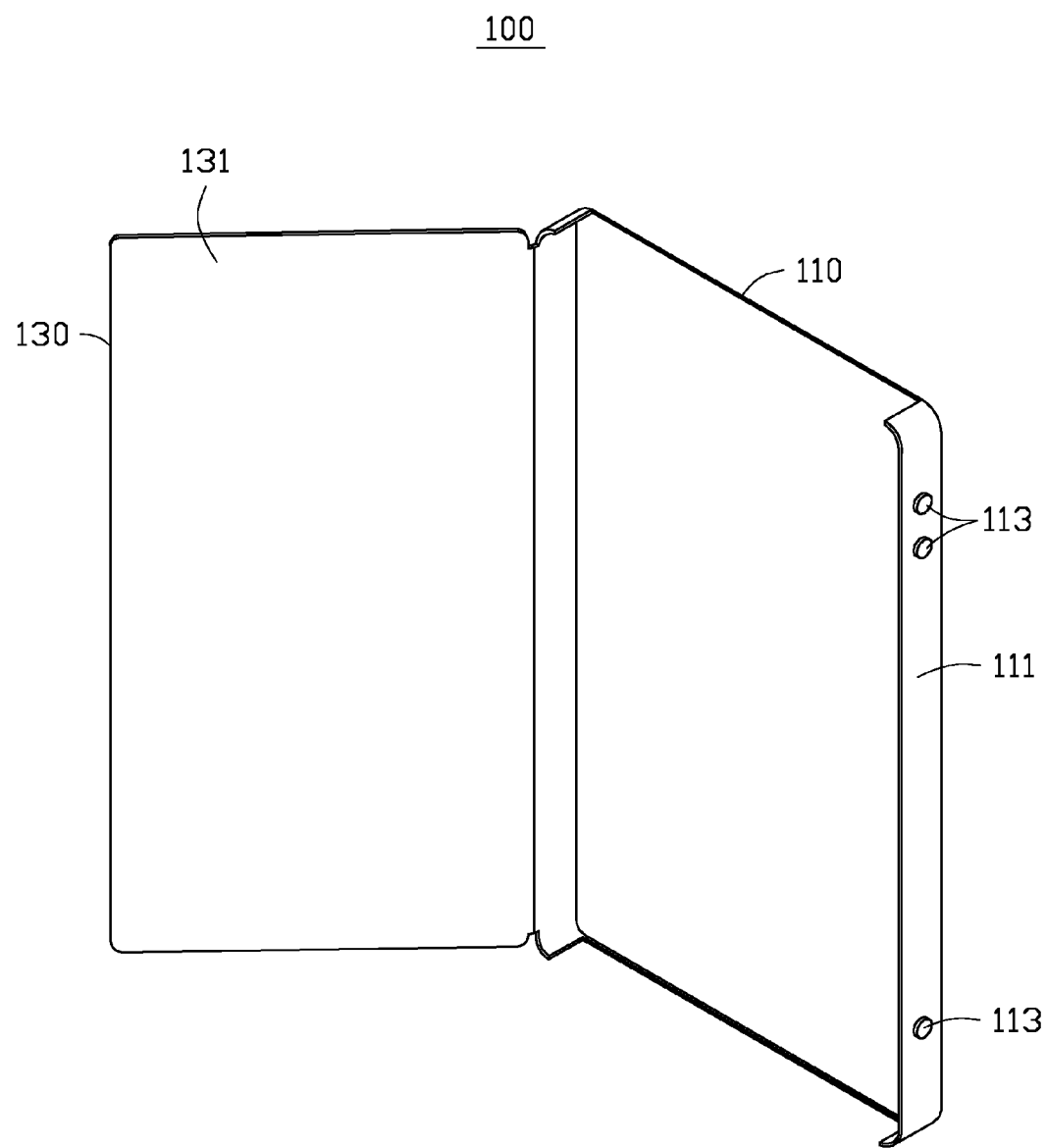
FIG. 2 is an isometric view of a first embodiment of a case for the electronic device, a cover of the case being in an open state.
Figure 3:
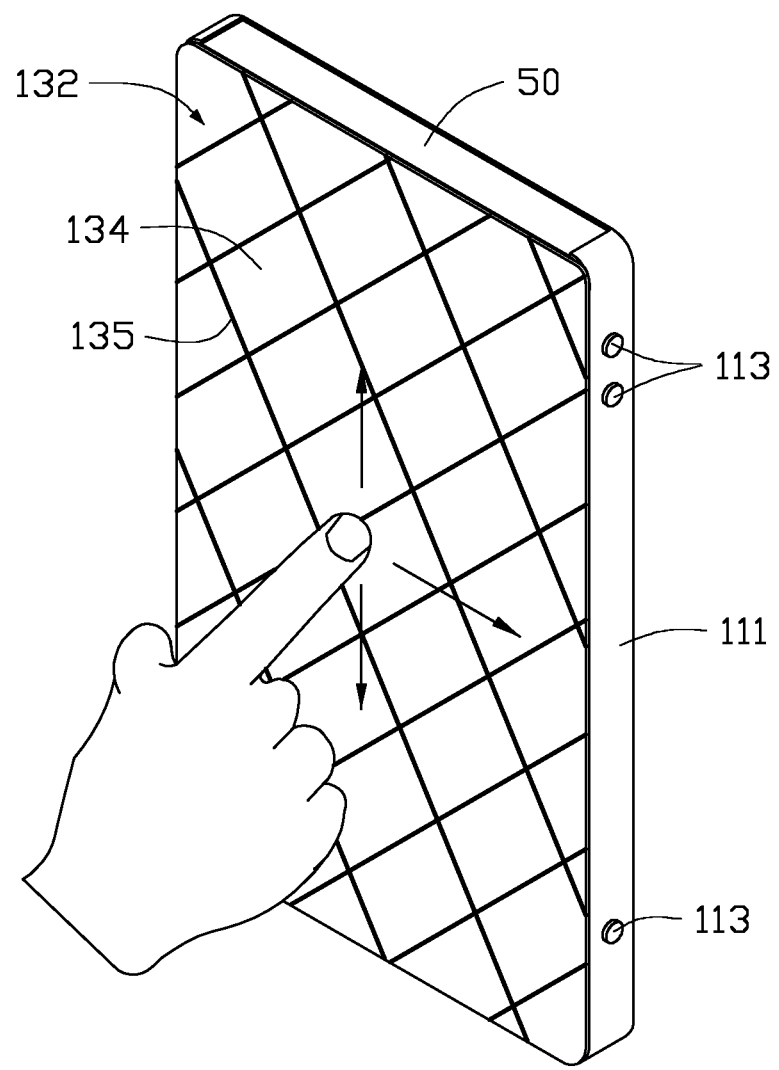
FIG. 3 is similar to FIG. 2, but shows the cover of the case in a closed state.

FIGS. 1-3 illustrate a first embodiment of a case 100 for an electronic device 50. In at least one embodiment, the electronic device 50 can be a mobile phone, a tablet computer, a personal digital assistant, or the like. The electronic device 50 can include a pressure-sensitive touchscreen 51 and a pressure sensing interface 53. The electronic device 50 can further include a processor 55 for executing predefined functions or executing functions in response to user operations.

The case 100 can include a main body 110. The main body 110 can define a receiving space (not labeled) for receiving the electronic device 50 therein. The pressure-sensitive touchscreen 51 can face out of the receiving space. The main body 110 can include a sidewall 111. The sidewall 111 can include at least one pressing portion 113 corresponding to the pressure sensing interface 53. In the illustrated embodiment, there are three pressing portions 113. Each pressing portion 113 can correspond with a corresponding portion of the pressure sensing interface 53 to control functions of the electronic device 50. For example, the pressure sensing interface 53 can sense a gesture, a direction, and a pressure of a user operation on the pressing portion 113.

The case 100 can include a cover 130 rotationally coupled to the main body 110. The cover 130 can be substantially the same in size and shape as the pressure-sensitive touchscreen 51. In at least one embodiment, the cover 130 can be able to rotate about 360 degrees relative to the main body 110. When the electronic device 50 is received inside the case 100, the cover 130 can cover or uncover the pressure-sensitive touchscreen 51.

The cover 130 can include a first surface 131 and a second surface 132 opposite from the first surface 131. The first surface 131 can adhere to the pressure-sensitive touchscreen 51 of the electronic device 50 when the cover 130 is in a closed state (i.e., covering the pressure-sensitive touchscreen 51). Touch input applied on the second surface 132 can be transferred to the pressure-sensitive touchscreen 51. The second surface 132 can be divided into a plurality of pressing areas 134 by a plurality of partitioning grooves 135. Each of the plurality of pressing areas 134 can transfer touch input applied thereon to the pressure-sensitive touchscreen 51 when the cover 130 is in the closed state. Each pressing area 134 can correspond with a corresponding portion of the pressure-sensitive touchscreen 51 to control functions of the electronic device 50. For example, the pressure-sensitive touchscreen 51 can sense a gesture, a direction, and a pressure of a user operation on the pressing areas 134. By dividing the second surface 132 into the plurality of pressing areas 134, a precision of transferring the touch input on the second surface 132 to the pressure-sensitive touchscreen 51 can be increased. By transferring the touch input on the second surface 132 to the pressure-sensitive touchscreen 51, the cover 130 does not need to be opened.

In at least one embodiment, the pressing portions 113 and the pressing areas 134 can have a contacting element (not shown), such as a projection, a magnetic element, or a conducting element to facilitate transmission of touch input thereon.

In at least one embodiment, the pressing portions 113 and the pressing areas 134 can elastically contact the pressure sensing interface 53 and the pressure-sensitive touchscreen 51, respectively, to increase a restoring force on the pressing portions 113 and the pressing areas 134 after receiving touch input thereon. For example, the pressing portions 113 and the pressing areas 134 can include an elastic element (not shown) made of rubber, plastic, or other elastic material. In at least one embodiment, the pressing portions 113 and the pressing areas 134 can be buttons.

In at least one embodiment, the cover 130 can include a plurality of elastic elements (not shown) extending along the plurality of partitioning grooves 135. Thus, each pressing area 134 is surrounded by corresponding elastic elements. When the pressing areas 134 are pressed, the corresponding elastic elements surrounding the pressing areas 134 are compressed to facilitate transmission of the touch input to the pressure-sensitive touchscreen 51.

In at least one embodiment, an outer surface of the pressing portions 113 and the pressing areas 134 can have labels (not shown) to show the functions of the pressing portions 113 and the pressing areas 134. For example, the labels can be stickers, words, Braille, or the like.

In at least one embodiment, the cover 130 is non-transparent. The electronic device 50 can include a sensing element 57 for sensing whether the cover 130 is in the open state or the closed state. The processor 55 can execute functions of the electronic device according to a plurality of user-defined touch gestures and according to the sensing element 57. For example, when the cover 130 is in the closed state, the plurality of touch gestures can include an upward swipe to answer a phone call, a downward swipe to reject a phone call, a sideward swipe to mute the electronic device, and the like. In at least one embodiment, the sensing element 57 can be a proximity sensor, an ambient light sensor, a Hall sensor, or any combination thereof.

In at least one embodiment, the main body 110 of the case 100 can be omitted.

Figure 4:
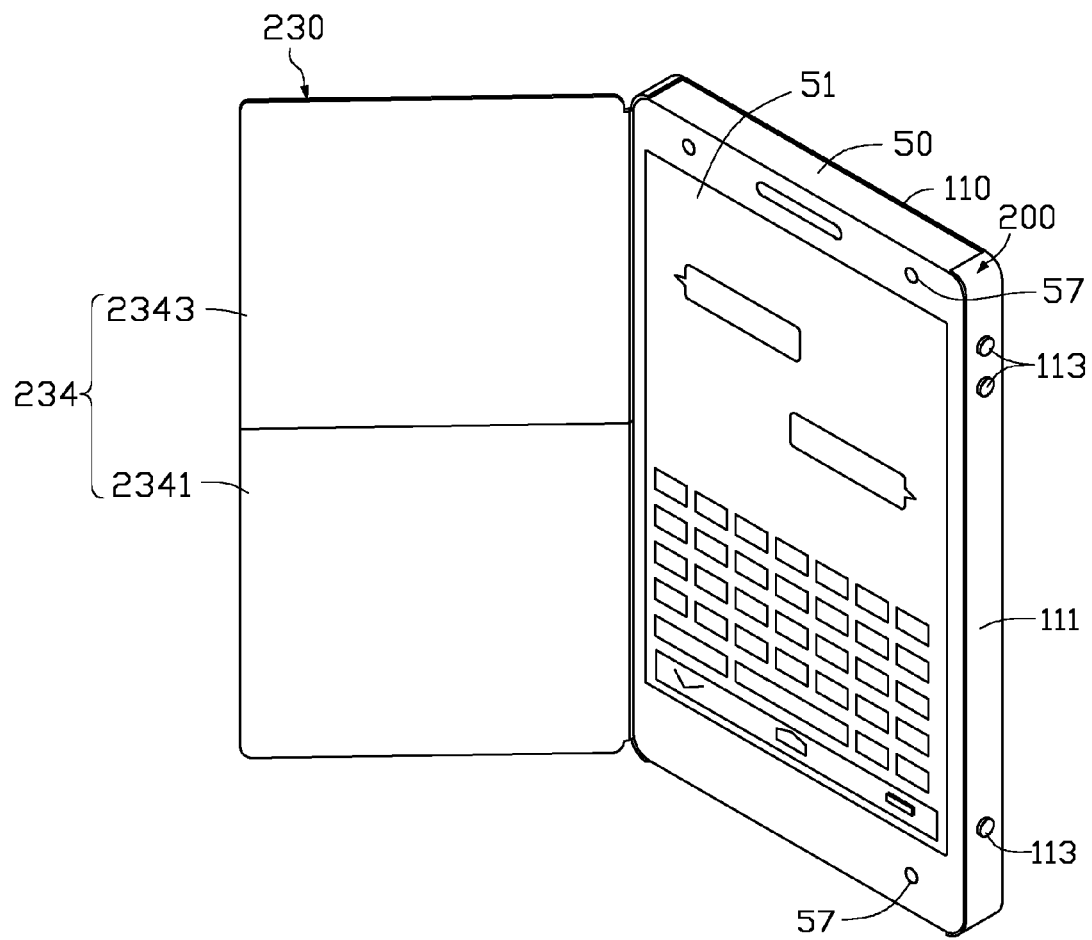
FIG. 4 is an isometric view of a second embodiment of a case receiving an electronic device therein.
Figure 5:
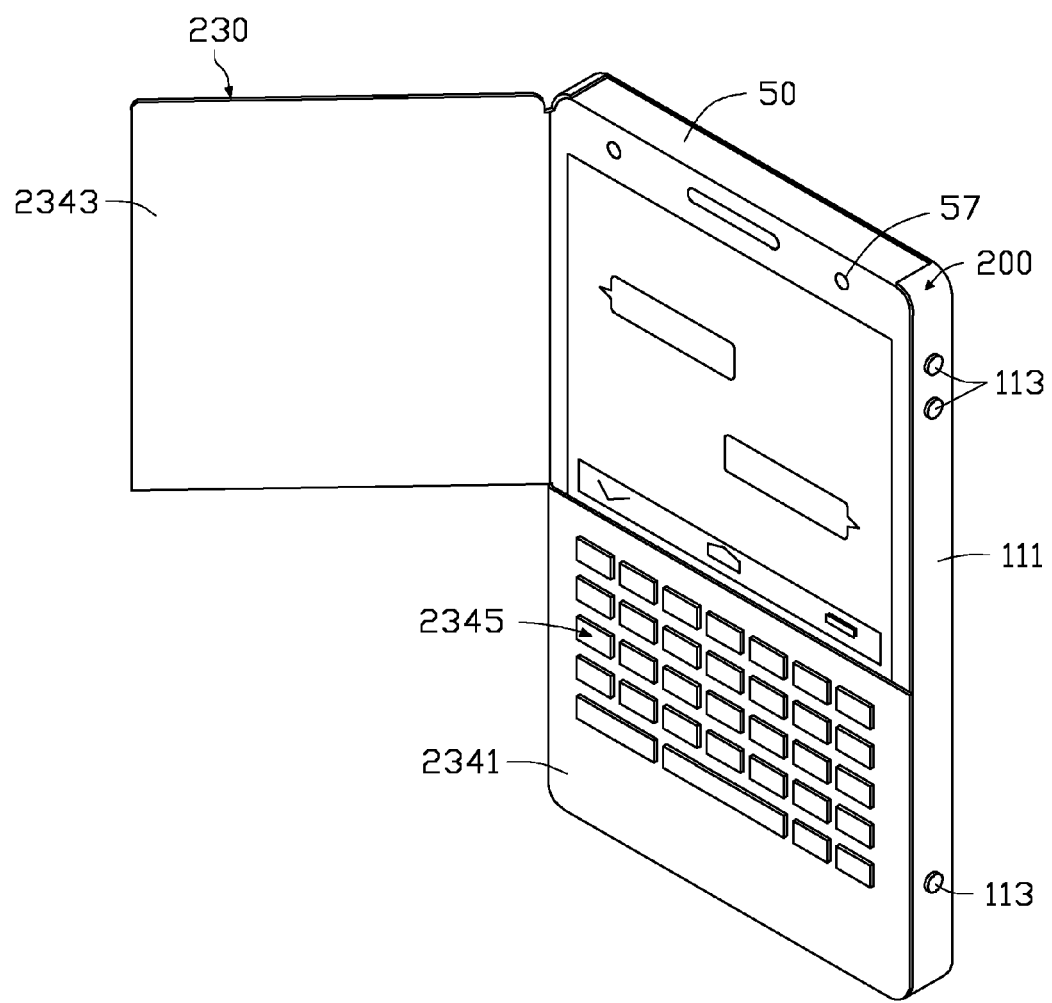
FIG. 5 is similar to FIG. 4, but shows the case in another configuration.

FIG. 4 and FIG. 5 illustrate a second embodiment of a case 200 for an electronic device 50. The electronic device 50 of the second embodiment can be substantially the same as the electronic device 50 of the first embodiment.

The case 200 of the second embodiment can be substantially the same as the case 100 of the first embodiment. In the second embodiment, the case 200 can include a cover 230. The cover 230 can be rotationally coupled to a main body (not labeled) of the case 200. The main body can define a receiving space (not labeled) for receiving the electronic device 50 therein.

The cover 230 can include a first surface (not labeled) facing toward the pressure-sensitive touchscreen 51 and a second surface (not labeled) facing away from the pressure-sensitive touchscreen 51. The cover 230 can be divided into a first cover portion 2341 and a second cover portion 2343. The first cover portion 2341 and the second cover portion 2343 can each be independently rotationally coupled to the main body. The first cover portion 2341 and the second cover portion 2343 can latch together to rotate together. The first cover portion 2341 can correspond to a first display portion of the pressure-sensitive touchscreen 51, and the second cover portion 2343 can correspond to a second display portion of the pressure-sensitive touchscreen 51.

In at least one embodiment, when the first cover portion 2341 and the second cover portion 2343 are both in an open state (i.e., not covering the pressure-sensitive touchscreen 510), the processor 55 can control the second display portion of the pressure-sensitive touchscreen 51 to display a virtual keyboard interface to allow text to be input to the first display portion. The second surface of the first cover portion 2341 can include a plurality of buttons 2345. When the first cover portion 2341 is in the closed state, touch input on the plurality of buttons 2345 can be transferred to the corresponding virtual keyboard interface to allow text to be input to the first display portion. The operating principle of the plurality of buttons 2345 can be substantially the same as the plurality of pressing areas 134 of the first embodiment.

The second surface on the second cover portion 2343 can be substantially the same as the second surface 132 of the first embodiment. A plurality of touch gestures can be applied on the second surface of the second cover portion 2343 to control functions of the electronic device 50. The plurality of touch gestures can include an upward swipe to answer a phone call, a downward swipe to reject a phone call, a sideward swipe to mute the electronic device, and the like.

In the illustrated embodiment, the cover 230 is divided along the width of the cover 230. In another embodiment, the cover 230 can be divided along the length of the cover 230.

Figure 6:
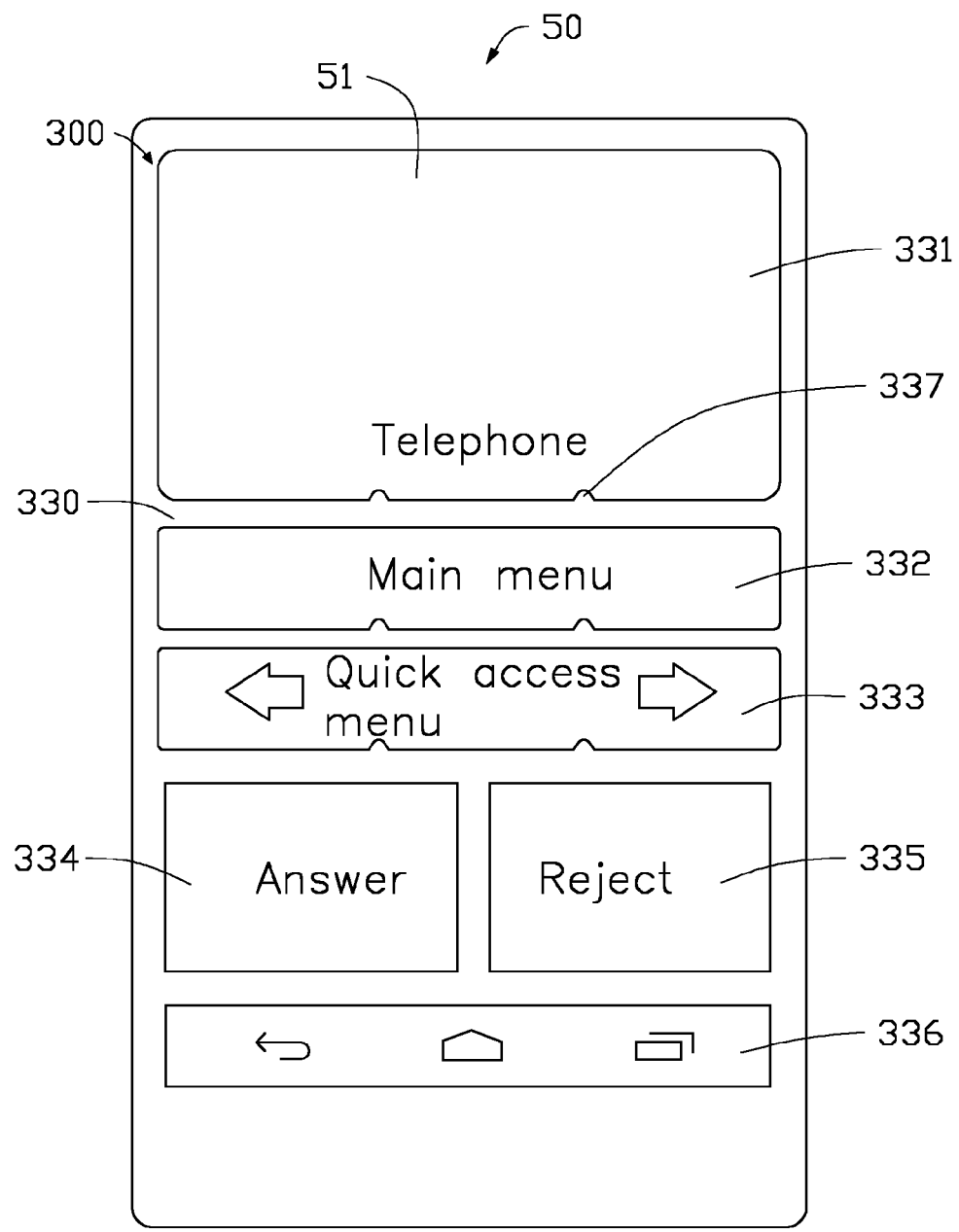
FIG. 6 is a third embodiment of a case for an electronic device, the electronic device displaying in a modular display mode.
Figure 7:
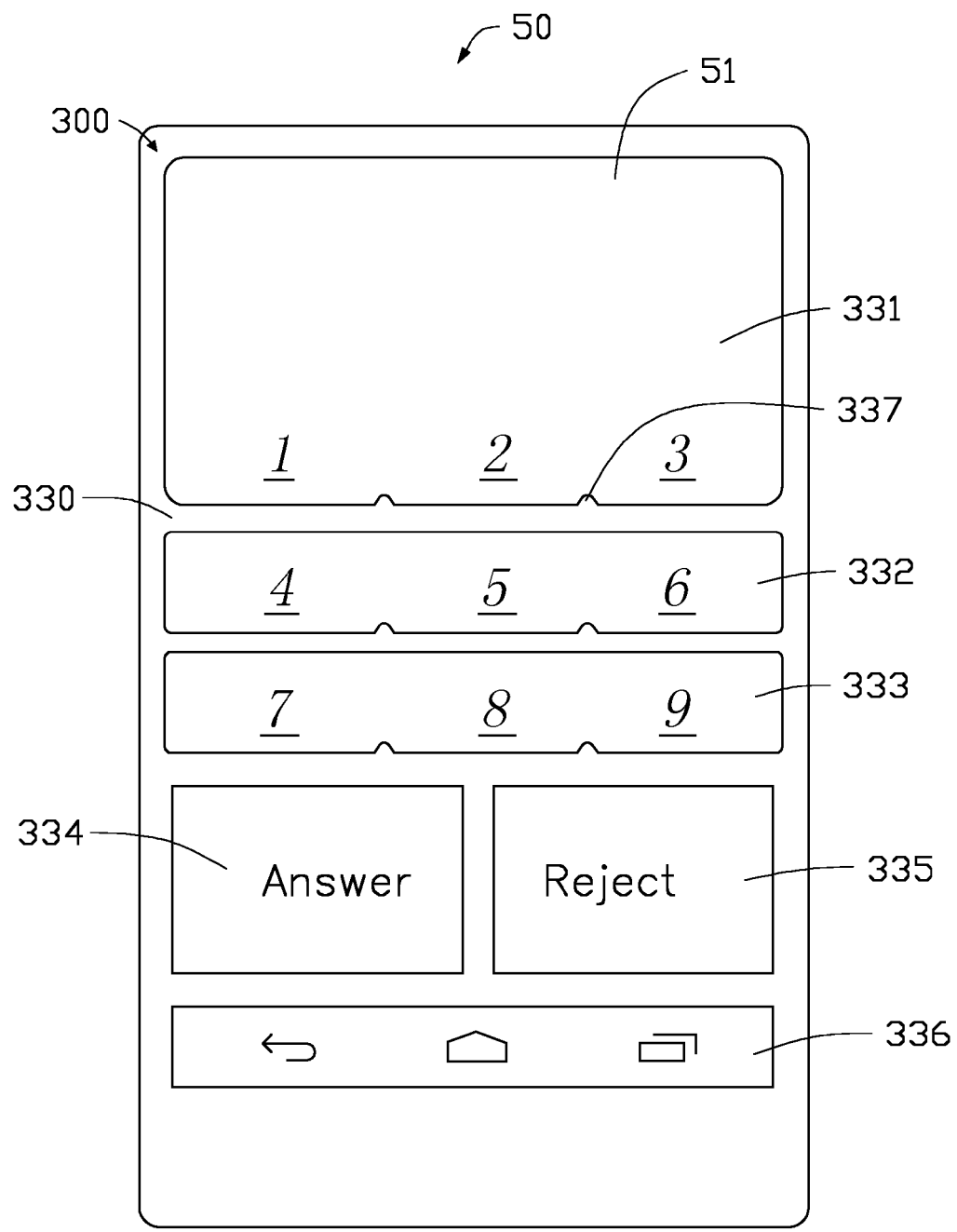
FIG. 7 is similar to FIG. 6, but shows the electronic device displaying another aspect of the modular display mode.

FIG. 6 and FIG. 7 illustrate a third embodiment of a case 300 for an electronic device 50. The case 300 and the electronic device 50 can be substantially the same as the case 100 and the electronic device 50 of the first embodiment. The case 300 can include a cover 330.

The cover 330 can include a first surface (not shown) and a second surface (not shown) opposite from the first surface. Touch input applied on the second surface can be transferred to the pressure-sensitive touchscreen 51.

The pressure-sensitive touchscreen 51 can display in different display modes according to a state of the cover 330. In at least one embodiment, the pressure-sensitive touchscreen 51 can display in a full-screen display mode and a modular display mode. The pressure-sensitive touchscreen 510 can display in the full-screen display mode when the cover 330 is in an open state (i.e., not covering the pressure-sensitive touchscreen 510). The pressure-sensitive touchscreen 510 can display in the modular display mode when the cover 330 is in the closed state (i.e., covering the pressure-sensitive touchscreen 510). In the modular display mode, the pressure-sensitive touchscreen 51 displays a plurality of modular display areas. Each modular display area is viewable through a corresponding window of the cover 330. For example, a first modular display area can be viewable through a first window 331, a second modular display area can be viewable through a second window 332, a third modular display area can be viewable through a third window 333, a fourth modular display area can be viewable through a fourth window 334, a fifth modular display area can be viewable through a fifth window 335, and a sixth modular display area can be viewable through a sixth window 336. An edge of the windows can form one or more protrusions 337 to provide tactile sensation around the window. In at least one embodiment, the plurality of windows can be openings defined in the cover 330 to allow the modular display areas to be viewable through the plurality of windows.

In at least one embodiment, the first window 331, the second window 332, and the third window 333 can be openings defined in the cover 330, and the fourth window 334, the fifth window 335, and the sixth window 336 can be pressing areas like the pressing areas 134 in FIG. 3 or buttons like the buttons 2345 in FIG. 5. The first modular display area can display a telephone number, messages, pictures, videos, and the like. For example, the first modular display area can display a telephone keypad and be pressed to make a phone call. In at least one embodiment, the second modular display area can display a main menu. In at least one embodiment, the third modular display area can display a quick access menu. For example, the quick access menu can be scrolled by swiping left or right within the third window 333. In at least one embodiment, selecting an item displayed within the second window 332 or the third window 333 can open a corresponding interface shown within the first window 331. In at least one embodiment, the fourth window 334 can be an answer button for answering a telephone call, and the fifth window 335 can be a reject button for rejecting a telephone call. For example, the fourth window 334 can be pressed to answer a telephone call, and the fifth window 335 can be pressed to reject the telephone call. In at least one embodiment, the sixth window 336 can be functional buttons. The fourth window 334, the fifth window 335, and the sixth window 336 are substantially similar in function to the plurality of pressing areas 134 shown in FIG. 3 or the buttons 2345 shown in FIG. 6.

Referring to FIG. 7, the interface for calling a telephone number can be displayed within the first window 331, the second window 332, and the third window 333. For example, the first, second, and third modular display areas can display numerals for dialing a telephone number.

By using the case 100, 200, and 300, touch input can be easily applied to the pressure-sensitive touchscreen of the corresponding electronic device without having to open the cover 130, 230, and 330.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A case for an electronic device having a pressure-sensitive touchscreen, the case comprising:
a cover having a first surface facing toward the pressure-sensitive touchscreen in a closed state and a second surface opposite from the first surface; and
a main body configured to receive the electronic device therein;
wherein the second surface includes at least one pressing area, and the at least one pressing area is in elastic contact with the pressure-sensitive touchscreen and configured to receive a touch input thereon to elastically transfer the touch input to the pressure-sensitive touchscreen; and
wherein the cover comprises a first cover portion and a second cover portion each independently rotationally coupled to the main body, the first cover portion corresponds to a first display portion of the pressure-sensitive touchscreen, and the second cover portion corresponds to a second display portion of the pressure-sensitive touchscreen.

2. The case as in claim 1, wherein the second surface is divided into a plurality of pressing areas by a plurality of partitioning grooves.

3. The case as in claim 1, wherein:
the cover defines at least one opening through which at least one modular display area displayed by the pressure-sensitive touchscreen is viewable; and
the at least one window transmits touch input to the corresponding at least one modular display area.

4. The case as in claim 1, wherein the main body comprises:
at least one sidewall; and
at least one pressing portion protruding from the at least one sidewall and configured to receive another touch input thereon to control functions of the electronic device.

5. The case as in claim 4, wherein:
the at least one pressing portion overlaps with a pressure sensing interface of the electronic device; and
the at least one pressing portion transfers the another touch input thereon to the pressure sensing interface of the electronic device to control functions of the electronic device.

6. The case as in claim 1, wherein:
the cover is capable of being in the closed state or an open state;
the cover in the closed state covers the pressure-sensitive touchscreen and covers a sensing element of the electronic device;
the cover in the open state does not cover the pressure-sensitive touchscreen and does not cover the sensing element; and
the cover in the closed state is able to receive the touch input for controlling functions of the electronic device.

7. The case as in claim 1, wherein:
the first cover portion and the second cover portion are each independently coupled to the main body and each rotatable relative to the main body; and
the pressure-sensitive touchscreen is configured to operate in different display modes according to a state of the first and second cover portions.

8. The case as in claim 7, wherein:
the first and second cover portions each comprise the first surface and the second surface opposite from the first surface;
the state of the first cover portion is either a closed state or an open state; and
the state of the second cover portion is either a closed state or an open state.

9. The case as in claim 1, wherein the first cover portion includes at least one opening through which at least one display area of the pressure-sensitive touchscreen is viewable.

10. The case as in claim 9, wherein the at least one pressing area is located on the second cover portion.

11. An assembly comprising an electronic device and a case as recited in claim 1, wherein the case has a main body for receiving the electronic device.

12. A case for an electronic device having a touchscreen, the case comprising:
a cover having a first surface facing toward the touchscreen in a closed state and a second surface opposite from the first surface; and
a main body configured to couple the electronic device;
wherein the second surface includes at least one pressing area, and the at least one pressing area is configured to receive a touch input thereon to transfer the touch input to the touchscreen; and
wherein the cover comprises a first cover portion and a second cover portion each independently rotationally coupled to the main body, the first cover portion corresponds to a first display portion of the touchscreen, and the second cover portion corresponds to a second display portion of the touchscreen.

13. The case as in claim 12, wherein the second surface is divided into a plurality of pressing areas by a plurality of partitioning grooves.

14. The case as in claim 12, wherein:
the first cover portion and the second cover portion are each independently coupled to the main body and each rotatable relative to the main body; and the touchscreen is configured to operate in different display modes according to a state of the first and second cover portions.

15. The case as in claim 14, wherein:

the state of the first cover portion is either a closed state or an open state; and the state of the second cover portion is either a closed state or an open state.

16. An electronic device, comprising:

a touchscreen; and a cover having a first surface facing toward the touchscreen in a closed state and a second surface opposite from the first surface;

wherein the second surface includes at least one pressing area, and the at least one pressing area is configured to receive a touch input thereon to transfer the touch input to the touchscreen; and wherein the cover comprises a first cover portion and a second cover portion each independently rotatable relative to the touch screen, the first cover portion corresponds to a first display portion of the touchscreen, and the second cover portion corresponds to a second display portion of the touchscreen.

17. The case as in claim 16, wherein the second surface is divided into a plurality of pressing areas by a plurality of partitioning grooves.

18. The case as in claim 16, wherein:

the touchscreen is configured to operate in different display modes according to a state of the first and second cover portions.

19. The case as in claim 18, wherein:

the state of the first cover portion is either a closed state or an open state; and the state of the second cover portion is either a closed state or an open state.

* * * * *